Figure 5:
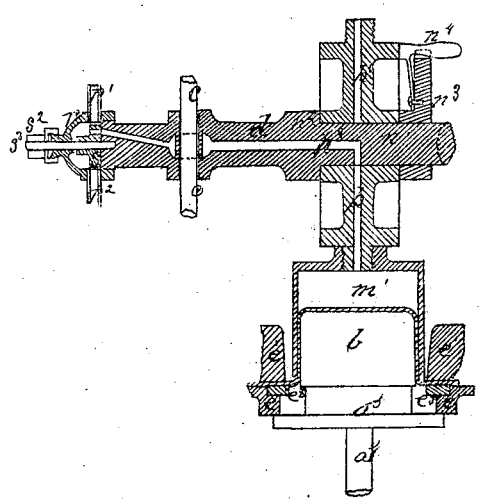

R. Eickemeyer.
Blocking & Shaping Hats.
Nº 72726  Patented Dec. 31, 1867.
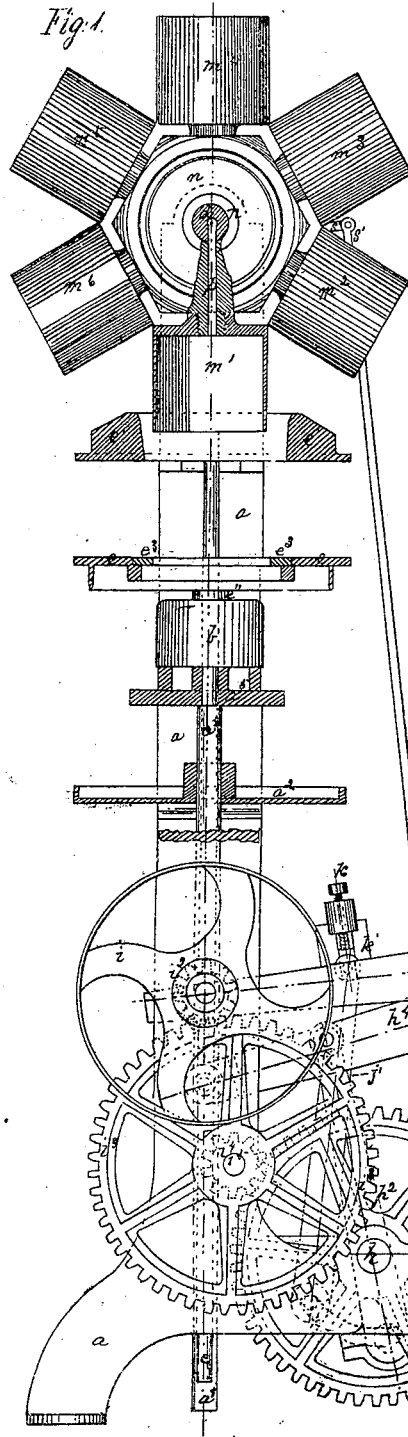
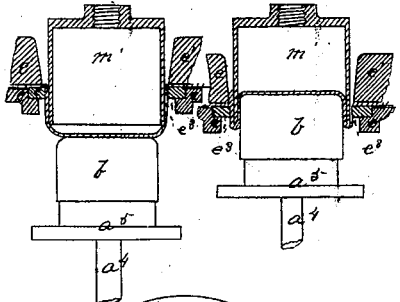
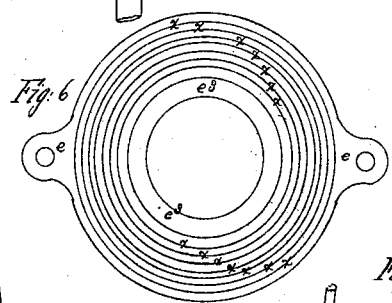
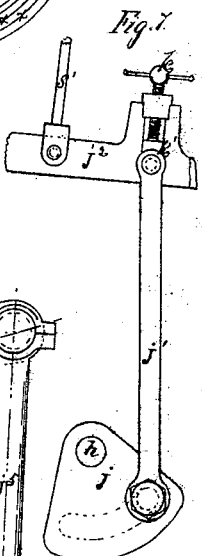
Witnesses
Inventor
R. Eickemeyer

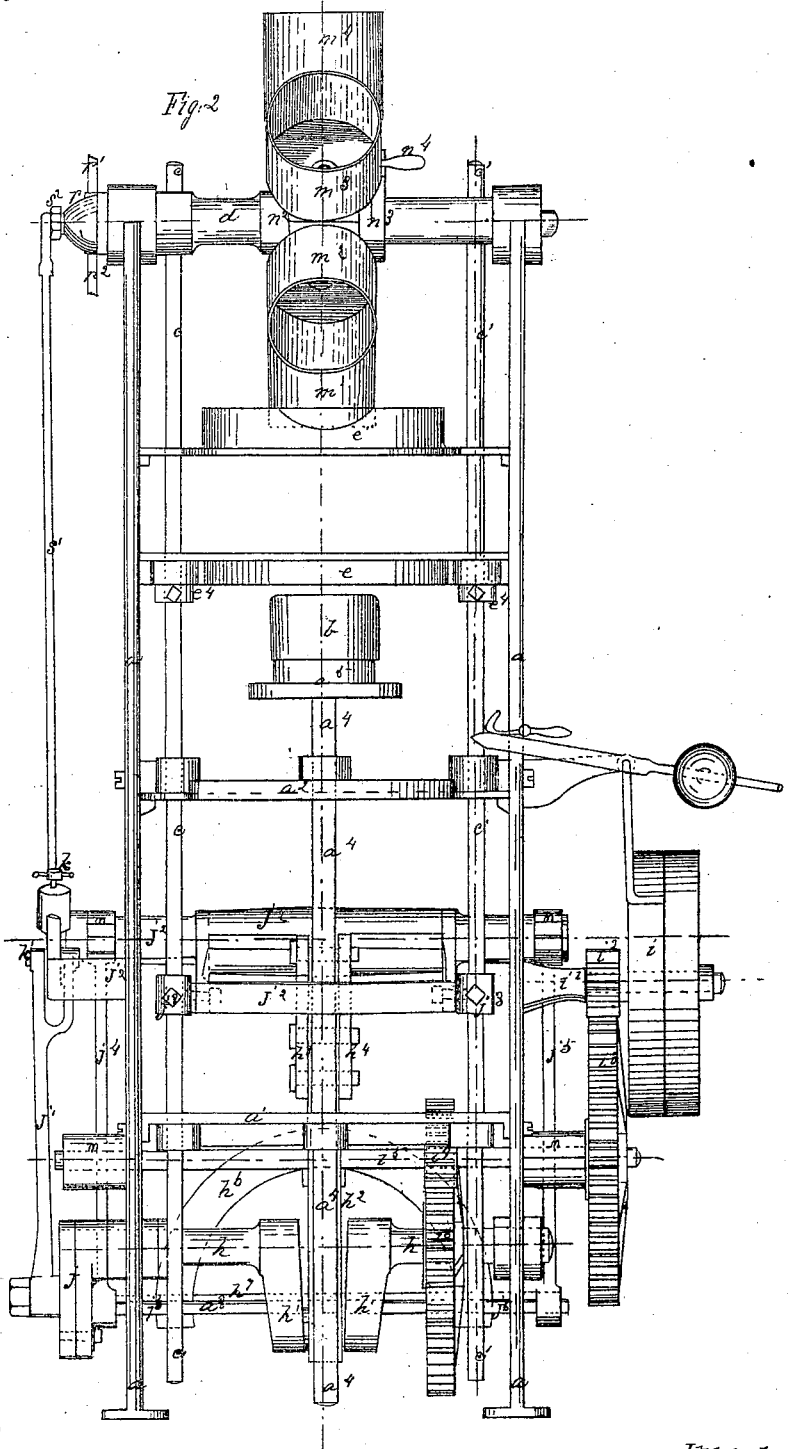

R. Eickemeyer.
Blocking & Shaping Hats.

Nº 72726. Patented Dec. 31, 1867.

Witnesses

Inventor
R. Eickemeyer

United States Patent Office.

RUDOLF EICKEMEYER, OF YONKERS, NEW YORK, ASSIGNOR TO EICKEMEYER HAT-BLOCKING MACHINE COMPANY, OF SAME PLACE.

*Letters Patent No. 72,726, dated December 31, 1867.*

IMPROVEMENT IN MACHINES FOR BLOCKING AND SHAPING HATS.

*The Schedule referred to in these Letters Patent and making part of the same.*

TO ALL WHOM IT MAY CONCERN:

Be it known that I, RUDOLF EICKEMEYER, of Yonkers, in the county of Westchester, and State of New York, have invented certain Improvements in Means for Blocking and Shaping Fur and Wool Hat-Bodies; and I do hereby declare that the following is a full and correct description thereof, reference being had to the annexed drawings, and to the letters of reference thereon.

My said improvements are applicable to the machine for blocking and stretching hats described and shown in Letters Patent of the United States granted to George Osterheld and Rudolf Eickemeyer, on the 3d day of April, 1866.

My said invention consists, first, in the employment of steam within the banding-shell, in combination with the banding-shell during the operation of stretching and blocking, substantially as herein described, whereby the operation of shaping and blocking is greatly facilitated; second, in combining with a banding-shell, or series of banding-shells, a valve controlling the steam-passage thereto, and a connection with the vibrating-frame or some other part of the machine, which moves in unison with the clamping-plates, whereby the valve is automatically opened to admit steam within the banding-shell in use when the clamping-plates have closed upon the brim, and commence to draw the side crown and top over the banding-shell, and is held open until the block has risen to its highest point within the shell, or nearly so, substantially as hereinafter described; third, in an arrangement and combination of a series of banding-shells of different sizes upon a wheel which turns upon a horizontal axis above the clamping-plates, and is provided with a suitable locking-mechanism, the whole substantially as hereinafter described, and for the purpose of rapidly shifting the shells to suit different sizes of hats, the operator having only to release the wheel from the locking-mechanism, when he desires to change the size of the shell, turn the wheel of shells until the required shell comes in place over the clamping-plates, and then lock it in position to operate with the clamping-rings and block; fourth, in the arrangement of separate steam-passages, one leading from within each of the shells through the wheel to its bearing, in combination with a steam-passage through the horizontal shaft or axis, on which the wheel of shells turns to shift the shells, substantially as hereinafter described, whereby the steam-passage through the shaft communicates only with the steam-passage leading to the shell, that is, in place for use, and is shut off from the others. But in order to more particularly describe my invention, I will refer to the accompanying drawings, which represent the construction and operation of shaping and blocking-machine with my present improvements.

Figure 1 is a side elevation of the machine, partly in section.

Figure 2, a front view of the same.

Figures 3, 4, and 5, detached views, partly in section, representing the banding-shell, banding-ring, hat-block, and parts of the clamping-plates in different positions, to illustrate different stages of their operation; fig. 5 also showing section of hollow shaft, steam-ways, and wheel of shells.

Figure 6 is a plan of the lower clamping-plate and banding-ring.

Figure 7, detached view of adjustable crank connection.

The frame of the machine consists of two sides frames, $a\ a$, framed together by the cross-plates $a^1\ a^2$, and a tie-rod, $a^3$. The plate $a^2$ is made in the form of a shallow annular trough, to catch water that may come from the parts above in the operation of blocking. In the middle of the cross-plates $a^1\ a^2$ are bosses cast on the plates, through which holes are bored to serve as guides for the round vertical reciprocating lifting-rod or spindle, $a^4$, the upper end of which is secured to the hat-block carrier, $a^5$ by a flanged circular plate or disk of metal. The upper end of the lifting-rod extends through the hat-block carrier, and projects a little above the same, so that it may enter a hole in the centre of the bottom of the removable hat-block $b$, and serve as a guide in placing the same, and also to keep it in place. The hat-block $b$ is made of wood, as usual, and round or oval, of the different varieties of shapes and sizes used by hatters, that are suitable to the operation of this machine. Within the frame of the machine, and near the sides, are two round vertical lifting-rods, $c\ c^1$, one on each side of the hat-block, and in the plane of the hat-block lifting-rod. These lifting-rods move up and down through guide-holes, bored through bosses cast on the cross-plates $a^1\ a^2$, at the opposite ends thereof, and are further provided with guide-holes in the stationary horizontal shaft $d$, at the top of the machine, up through which these pass. These lifting-rods are moved simultaneously up and down in the operation of the machine, for the purpose of lifting up the clamping or holding-plates $e\ e^1$, their downward motion being due to gravity.

These clamping-plates are for the purpose of clamping or holding the hat-body by the brim during the operation of stretching and blocking, and each have circular openings concentric with the hat-block, and have holes at each side, through which their lifting-rods $c\ c^1$ pass freely. The lower plate $e$ has a flat upper surface, on which are inscribed concentric circles $x\ x$, fig. 6, to enable the operator to place the brim of the hat-body upon it concentrically with the block. The circular opening of this plate is flanged or rebated to receive the "banding-ring" $e^3$, which forms the band or angle between the side crown and tip. Banding-rings of different internal diameters must be provided corresponding to the different sizes and shapes of hats required. The one used must exceed by about one-quarter of an inch in its interior diameter the required size of the exterior of the lower part of the banding-shell. The upper holding-plate $e'$ has a central opening, somewhat larger than the exterior diameter of the stretching or banding-shells, and is made heavy enough to produce sufficient pressure to hold the brim of the hat-body between it and the banding-ring during the stretching and blocking-operation. When not lifted up by the rising of the lower holding-plate, the upper holding-plate rests upon lugs projecting inward from the side frames. Just below the lower holding-plate is an adjustable collar, $e^4$, upon each of the lifting-rods, by which the holding-plates are lifted.

Motion is communicated to the hat-block lifting-rod $a^2$, by a crank, $h^1$, in the middle of the crank-shaft $h$, through the connecting-rod $h^2$, and vibrating-levers $h^3\ h^4$, which latter are coupled together and jointed at one end to the lifting-rod, and at the other end to an adjustable arm, $h^5$, projecting upward from a rocking-frame, $h^6$, which rocks on a cross-shaft, $h^7$, at the rear of the machine near the foot. The crank-shaft is driven from the driving-pulley $i$, which revolves on a stud, $i'$, projecting from the side of the frame, through the pinion $i^2$ fast to the pulley, a spur-wheel, $i^3$, and pinion, $i^4$, fast to the rotating shaft $i^5$ and spur-wheel $i^6$, fast to the crank-shaft. Motion is communicated to the two lifting-rods $c\ c^1$, which lift the holding-plates, by an adjustable crank, $j$, through a connecting-rod, $j^1$, and vibrating-frame $j^2$, which latter is jointed at the sides of the yoke in front by pins to the adjustable collars $j^3\ j^3$, which are fast to the lifting-rods, and also jointed at the rear end to the upright rocking-pillars $j^4\ j^5$, which are themselves pivoted and rock on the projecting ends of the stationary shaft $j^6$, on each side of the frame at the rear near the foot. The adjustable connection between the connecting-rod and vibrating-lever frame shown in fig. 7, is used to raise and lower the lever-frame for the purpose of adjusting it to raise the holding or clamping-plates high enough to stretch the hat-body over the banding-shell, but should the set-screw $k$, which operates on the bearing of the pin $k^1$ on the connecting-rod for that purpose, not be sufficient to stretch the hat completely out, then the collars $e^4$, upon the lifting-rods $c\ c^1$, are to be shifted up, to make up whatever more motion is wanted. The upward motions of the hat-block and holding-plates must be so timed that the holding-plates have risen to the full extent of their motion, and drawn the hat-body over the banding-shell, when the hat-block begins to enter the shell, and the crank is therefore made adjustable to accommodate different heights of hat-blocks, by means of a concentric slot, shown in dotted lines, fig. 7, in the one of the two sectors composing the crank, which is fast to the crank-shaft, and a coupling-bolt and nut, which connects it with the sector, which is loose on the crank-shaft, and which carries the crank-pin.

So far, the machine is substantially the same as that described in the above-mentioned Letters Patent to Osterheld and Eickemeyer. I will now proceed to describe the present improvements.

For the purpose of rapidly shifting the banding-shell in use for one of a different required size, I secure a series of, say, six banding-shells, $m^1\ m^2\ m^3\ m^4\ m^5\ m^6$, radially to the periphery of a hexagonal wheel, $n$, which turns on a bearing, $n^1$, in the middle of the horizontal shaft $d$. These banding-shells are thin metal cups, cylindrical or oval, as required, and they are of as much larger interior diameter than the hat-blocks to be used with each of them respectively as the thickness of the hat-body, in order to admit it between them. They should, for ordinary use, be adapted to be used with blocks of the sizes known as $6\frac{3}{4}$, $6\frac{7}{8}$, 7, $7\frac{1}{8}$, $7\frac{1}{4}$, $7\frac{3}{8}$, and have the sizes marked on them. The hubs of the wheel should be bored, and fitted accurately to the bearing on the stationary shaft on which it turns, because this bearing is also used as a steam-cock or valve, through which steam is let on and shut off from the banding-shells. The bearing must therefore be steam-tight, or nearly so. The wheel is kept in a central position on the horizontal shaft $d$ by the shoulder $n^2$ on one side, and on the other side by the hub of an arm, $n^3$, which arm holds the spring-catch $n^4$, used to lock the wheel in position, when any one of the banding-shells is brought vertically over the hat-block and concentric with it, there being six or as many notches on the side of the wheel as there are banding-shells, placed so that one notch will be engaged with the spring-catch whenever a banding-shell is in position to operate with the machine. To shift from one-size shell to another, it is only necessary to release the spring-catch, and turn the wheel of shells by hand until the required shell comes over the hat-block, when its exact position is determined by the locking-catch engaging with the appropriate notch.

This part of my invention is not necessarily connected with the use of steam in the banding-shells, the convenience of shifting the shells being the same whether the steam be used or not. The use of steam is, however, of great advantage, whether one or a series of banding-shells be used, as it softens the hat-body, which, before blocking, is stiffened with size or shellac, in a manner well known to hatters, and thereby facilitates the operation of overstretching and blocking. The steam, also, by pressing on the hat-body while the block is entering and rising in the shell, lays the tip square upon the block smoothly and evenly.

In order to introduce steam to any one of the shells when it is brought in position to operate with the block, there are six radial steam-passages in the wheel, one for each banding-shell, two of them, $p\ p^1$, being shown in fig. 5. These passages extend from within the banding-shell to the cylindrical bearing $n$, on the stationary horizontal shaft $d$, and when any one of the shells is in position to operate, the other five are cut off from the steam by the surface of the bearing $n$, and the steam-passage of the shell used communicates with the steam-passage $p^3$ in the horizontal shaft, which passes from the bottom of the bearing $n$ upward, and then through the shaft $d$, to the end of the same, at the side of the machine, being chambered around the guide-hole for the lifting-rod $c$. On the end of the shaft is screwed a hollow cap, $r$, which forms a sort of steam-chest, into which steam is admitted by a pipe, $r^1$, shown broken off, but to be connected with a steam-boiler or pipe, containing steam under pressure. A waste-pipe, $r^2$, is shown broken off in the drawing, but, in practice, is to be carried down to the floor, or away from the machine, in any suitable direction, to conduct the water of condensation from the valve-chest, and should be provided with a stop-cock, to close it when not required to be open.

In order to prevent the steam from passing into the shell, except at the time when it is required in the operation of stretching and blocking, the vibrating-lever frame (which operates the holding-plates) also gives motion to the valve $s$, through the connecting-rod $s^1$ and the arm $s^2$, fast to the horizontal spindle $s^3$ of the valve. The valve $s$ is an ordinary shut-off disk, valve, or gate, the steam-way through it being a hole through the plate, which is so placed by the adjustment of the parts as to coincide sufficiently with the steam-passage it controls, when the hat-body begins to be drawn over the banding-shell, as to permit steam to pass into the shell, and continue to pass, until the hat-block has reached its highest elevation within the shell, or thereabouts, when the hole having turned away from the steam-passage, the steam is cut off by the valve until another hat-body commences to be drawn over the banding-shell.

This part of my invention does not necessarily involve the use of a series of banding-shells mounted upon a wheel, although it is adapted thereto in the organization of the machine. The series of shells and wheel may be dispensed with, and a single shell attached directly to the horizontal shaft (which in that case would have to be lowered) by a hollow-screw fastening, such as is used to attach the banding-shells to the wheel; and this construction would preserve all the advantages of the use of the steam in the operation of blocking.

The operation of the machine is as follows: The parts being properly adjusted and in position, as shown in figs. 1 and 2, a hat-body that has been previously pulled out or stretched in the brim and tip by hand or machinery, as practised by hatters, and moistened by steam or hot water, is placed on the lower holding or clamping-plate, with the tip pointing upward, and the machine being in motion, the lower holding-plate rises with the hat-body until the upper holding-plate is reached, when they both rise together, holding the hat-body by the brim between them until the tip and crown of the hat-body are turned inside out and stretched over the banding-shell, and the band formed by the banding-ring. The hat-block has by this time reached the tip of the hat-body, which is somewhat distended downwards from the middle part of the banding-shell by the steam and water of condensation, and commences to press upon the tip, carrying it up into the shell, and the holding-plates, having commenced their downward motion, lower the brim of the hat-body, as required, by the raising of the hat-block within the shell, which thus receives the hat-body, by turning the crown right-side out around the edges of the shell, in manner represented in the illustrations, figs. 3, 4, and 5. When the hat-block has attained the highest elevation, and begun to descend, the rods $c\ c'$ are moving faster than the hat-block, and, consequently, the holding-plates, being free to rise on the lifting-rods, are detained by resting on the hat-block carrier, and move down with it, the upper plate stopping when it reaches the lugs, and the lower plate continuing to move down with the hat and block until (the range of motion of the hat-block being greater than that of the lower holding-plate) it overtakes and rests upon the collars of their lifters, the hat-block carrier moving further down below. The hat-block being held tight by the body, and merely resting on the hat-block carrier, (not being held in any manner to the carrier by the centre-pin, which only serves as a centring and steady-pin,) is taken off with the body as soon as the brim and block are free from the upper holding-plate; and if not desirable to immediately remove it from the blocked hat, another block is placed upon the hat-block carrier and another hat-body on the lower holding-plate, and the operation of blocking and shaping repeated as often as desired, without stopping the machine.

I claim—

1. Introducing steam within the banding-shell during the operation of stretching and blocking the hat-body, substantially as and for the purposes described.

2. In combination with a banding-shell, or a series of banding-shells, a valve controlling the steam-passage thereto, connected with and moved from the vibrating-frame or some other part of the machine, which moves in unison with the holding-plates, substantially as described, whereby the valve is automatically opened to admit steam within the banding-shell during the operation of stretching and blocking, and closed at other times to prevent the waste of steam.

3. The combination and arrangement of a series of banding-shells upon a wheel provided with a locking-mechanism, and organized with respect to the hat-block and holding-plates, substantially as described, whereby the operator can readily shift the shells to correspond with required changes of size of hats, substantially as set forth.

4. The arrangement and combination of the separate steam-passages from the banding-shells through the wheel, with the bearing and steam-passage through the horizontal shaft on which the wheel of shells turns, substantially as described, whereby the steam is cut off from all the banding-shells of the series except the one which is in the proper place to co-operate with the hat-block and holding-plates.

R. EICKEMEYER.

Witnesses:
    F. C. TREADWELL, Jr.,
    JOHN J. BARNETT.